United States Patent [19]

Kranig et al.

[11] Patent Number: 5,601,878
[45] Date of Patent: Feb. 11, 1997

[54] PROCESS FOR THE PRODUCTION OF A TWO-COAT FINISH, AND POWDER COATINGS SUITABLE FOR THIS PROCESS

[75] Inventors: Wolfgang Kranig, Senden; Klaus Cibura, Münster; Joachim Woltering, Münster; Christopher Hilger, Münster; Josef Rademacher, Münster, all of Germany

[73] Assignee: BASF Lacke + Farben. AG, Muenster-Hiltrup, Germany

[21] Appl. No.: 362,528

[22] PCT Filed: Jun. 23, 1993

[86] PCT No.: PCT/EP93/01601

§ 371 Date: Jan. 26, 1995

§ 102(e) Date: Jan. 26, 1995

[87] PCT Pub. No.: WO94/01504

PCT Pub. Date: Jan. 20, 1994

[30] Foreign Application Priority Data

Jul. 7, 1992 [DE] Germany .......................... 42 22 194.3

[51] Int. Cl.⁶ .................. C08L 67/02; C08L 73/02
[52] U.S. Cl. .................. 427/386; 427/407.1; 427/410; 427/419.1; 525/166; 525/167; 525/173; 525/174; 525/176; 525/934
[58] Field of Search ...................... 525/173, 176, 525/934, 174, 166, 167; 427/386, 410, 419.1, 407.1

[56] References Cited

U.S. PATENT DOCUMENTS 3,781,379  12/1973  Farmington .
4,091,048  5/1978   Labana .
5,055,524  10/1991  Pettit ........................ 525/172

FOREIGN PATENT DOCUMENTS

0038635A1  3/1981  European Pat. Off. .......... C09D 3/66
0212457A2  8/1986  European Pat. Off. .......... B05D 7/14
4032391A1  10/1990 Germany ....................... B05D 7/16

*Primary Examiner*—Patricia A. Short
*Attorney, Agent, or Firm*—Anne Gerry Sabourin

[57] ABSTRACT

The invention relates to a process for the production of two-coat finishes, in which a pigmented basecoat is first applied, the resulting basecoat film is coated with a powder clearcoat, and basecoat and clearcoat are subsequently baked together. In accordance with the invention, the powder clearcoat employed is a powder coating which contains an epoxide group-containing polyacrylate resin as binder and a mixture of (A) a polyanhydride and (B) a carboxyl group-containing polyester resin as crosslinking agent. The polyester resin can be prepared by reacting a diol (b1), a compound (b2) which contains per molecule at least three functional groups selected from hydroxyl, primary amino, secondary amino, carboxyl and acid anhydride groups, and (b3) a dicarboxylic acid in a molar ratio of (b1): (b2): (b3)=0.0 to 3.0: 1.0: 1.5 to 9.0 to give a polyester resin having an acid value of 40 to 300.

5 Claims, No Drawings

5,601,878

PROCESS FOR THE PRODUCTION OF A TWO-COAT FINISH, AND POWDER COATINGS SUITABLE FOR THIS PROCESS

The invention relates to a process for the production of two-coat finishes on a substrate surface, in which
(1) a pigmented basecoat is applied to the substrate surface,
(2) a polymer film is formed from the coat applied in step (1),
(3) a powder clearcoat which contains an epoxide group-containing polyacrylate resin as binder is applied to the resulting basecoat film, and subsequently
(4) the basecoat is baked together with the powder clearcoat.

The invention also relates to powder coatings which contain an epoxide group-containing polyacrylate resin as binder.

The process described above for the production of two-coat finishes is known. Using this process, finishes (for cars in particular) can be produced which, particularly with regard to gloss, hiding ability, decorative effect, weathering resistance and refinishability, have distinct advantages over one-coat finishes. To achieve these advantages, however, the coatings employed must have quite specific properties tailored to the coating process described above.

The basecoat applied in step (1) provides color, hiding ability and effect (especially when using metallic pigments for a metallic effect).

The pigmented basecoat film obtained after applying the basecoat is preferably coated in the unbaked state with a clearcoat. Basecoat and clearcoat are then baked together. It is of decisive importance here that the spatial distribution and/or the spatial orientation of the pigments contained in the basecoat should be disturbed neither during the coating with a clearcoat nor during the combined baking. A disturbance of this nature leads to impairment of the visual appearance of the coating. The clearcoat applied to the basecoat is intended to provide the two-coat finish in particular with gloss, body, topcoat appearance and resistance to weathering, chemicals, water and physical stresses. The clearcoat is not permitted to disturb the basecoat either during the overcoating of the basecoat or during the baking operation, but must provide clearcoat films which, after baking, adhere well to the basecoat and exhibit the stated properties.

For economic and ecological reasons it is desirable for the clearcoats employed in the process under discussion for the production of two-coat finishes to be powder clearcoats. Attempts have therefore been made to use powder clearcoats which contain an epoxide group-containing polyacrylate resin as binder to produce two-coat finishes of the type described above (cf. EP-A-299,420). However, it was found that the resulting two-coat finishes are in need of improvement.

The object on which the present invention is based consists in the provision of a process for the production of two-coat finishes of the type described above, in which a powder clearcoat is employed in step (3) which contains an epoxide group-containing polyacrylate resin as binder and with which two-coat finishes can be produced which in comparison to two-coat finishes of the prior art have improved properties.

This object is surprisingly achieved by a process of the type described above in which a powder clearcoat is employed in step (3) which contains as crosslinking agent a mixture of (A) 5 to 95, preferably 5 to 80, particularly preferably 10 to 50 percent by weight of a compound which contains on statistical average at least two carboxyl groups and at least one, preferably at least two acid anhydride groups per molecule, or a mixture of such compounds, and (B) 95 to 5, preferably 95 to 20, particularly preferably 90 to 50 percent by weight of a carboxyl group-containing polyester resin which is obtainable by reacting
(b1) a diol or a mixture of diols,
(b2) a compound which contains per molecule at least three functional groups selected from hydroxyl, primary amino, secondary amino, carboxyl and acid anhydride groups, one acid anhydride group being regarded as equivalent to two carboxyl groups, or a mixture of such compounds, and
(b3) a dicarboxylic acid, a dicarboxylic acid anhydride or a mixture of dicarboxylic acids and/or dicarboxylic acid anhydrides in a molar ratio of (b1):(b2):(b3)=0.0 to 3.0:1.0:1.5 to 9.0, preferably 0.0 to 2.0:1.0:2.0 to 8.0, particularly preferably 0.5 to 2.0:1.0:2.0 to 6.0 to give a polyester resin having an acid value of 40 to 300, preferably 80 to 250, the percentages by weight relating to (A)+(B)=100 percent by weight.

Two-coat finishes obtained using the process according to the invention in relation to two-coat finishes of the prior art have improved resistance to alkalis, wood resin, pancreatin, premium-grade petrol and methyl ethyl ketone, better scratch resistances and better metallic effects, and are harder than two-coat finishes of the prior art.

In step (1) of the process according to the invention any pigmented basecoats suitable for producing two-coat finishes can be employed. Such basecoats are familiar to those skilled in the art. Both water-thinnable basecoats and basecoats based on organic solvents can be employed. Suitable basecoats are described in, for example, U.S. Pat. No. 3,639,147, DE-A-3,333 072, DE-A-38 14 853, GB-A-2 012 191, U.S. Pat. No. 3,953,644, EP-A-260 447, DE-A-39 03 804, EP-A-320 552, DE-A-36 28 124, U.S. Pat. No. 4,719,132, EP-A-297 576, EP-A-69 936, EP-A-89 497, EP-A-195 931, EP-A-228 003, EP-A-38 127 and DE-A-28 18 100.

It is preferred in step (1) to employ a basecoat which contains a metallic pigment, preferably an aluminum flake pigment.

In step (2) of the process according to the invention, the organic solvents or the water are/is removed in a flash-off phase from the basecoat applied in step (1). It is preferred in step (2) for the basecoat not to be baked. It is of course also possible in step (2) to bake the basecoat at least partially. However, this is disadvantageous on economic grounds since two baking operations instead of one are then required to produce the two-coat finish.

It is essential to the invention that in step (3) of the process according to the invention a powder clearcoat is applied which contains an epoxide group-containing polyacrylate resin as binder and as crosslinking agent a mixture of (A) 5 to 95, preferably 5 to 80, particularly preferably 10 to 50 percent by weight of a compound which contains on statistical average at least two carboxyl groups and at least one, preferably at least two acid anhydride groups per molecule, or a mixture of such compounds, and (B) 95 to 5, preferably 95 to 20, particularly preferably 90 to 50 percent by weight of a carboxyl group-containing polyester resin which is obtainable by reacting
(b1) a diol or a mixture of diols, (b2) a compound which contains per molecule at least three functional groups selected from hydroxyl, primary amino, secondary amino, carboxyl and acid anhydride groups, one acid anhydride group being regarded as equivalent to two carboxyl groups, or a mixture of such compounds, and (b3) a dicarboxylic acid, a dicarboxylic acid anhydride or a mixture of dicarboxylic acids and/or dicarboxylic acid anhydrides in a molar ratio of (b1):(b2):(b3)=0.0 to 3.0:1.0:1.5 to 9.0, preferably 0.0 to 2.0:1.0:2.0 to 8.0, particularly preferably 0.5 to 2.0:1.0:2.0 to 6.0 to give a polyester resin having an acid value of 40 to 300 preferably 80 to 250, the percentages by weight being related in that (A)+(B)=100 percent by weight.

Powder clearcoats are understood to be powder coatings which are transparent, i.e. they either contain no pigments or are pigmented such that they are still transparent.

An epoxide group-containing polyacrylate resin is understood to be a polymer which can be prepared by copolymerization of at least one ethylenically unsaturated monomer which contains at least one epoxide group in the molecule with at least one further ethylenically unsaturated monomer which contains no epoxide group in the molecule, at least one of the monomers being an ester of acrylic acid or methacrylic acid.

Epoxide group-containing polyacrylate resins are known (cf. e.g. EP-A-299,420, DE-B-2,214,650, U.S. Pat. No. 4,091,048 and U.S. Pat. No. 3,781,379).

Examples of ethylenically unsaturated monomers which contain at least one epoxide group in the molecule are glycidyl acrylate, glycidyl methacrylate and allyl glycidyl ether.

Examples of ethylenically unsaturated monomers which contain no epoxide group in the molecule are alkyl esters of acrylic and methacrylic acid which contain 1 to 20 carbon atoms in the alkyl radical, in particular methyl acrylate, methyl methacrylate, ethyl acrylate, ethyl methacrylate, butyl acrylate, butyl methacrylate, 2-ethylhexyl acrylate and 2-ethylhexyl methacrylate. Further examples of ethylenically unsaturated monomers which contain no epoxide groups in the molecule are acids such as acrylic acid and methacrylic acid, acid amides such as acrylamide and methacrylamide, aromatic vinyl compounds such as styrene, methylstyrene and vinyltoluene, nitriles such as acrylonitrile and methacrylonitrile, vinyl and vinylidene halides such as vinyl chloride and vinylidene fluoride, vinyl esters such as vinyl acetate and hydroxyl group-containing monomers such as hydroxyethyl acrylate and hydroxyethyl methacrylate.

The epoxide group-containing polyacrylate resin conventionally has an epoxide equivalent weight of 400 to 2500, preferably 500 to 1500, particularly preferably 600 to 1200, a number-average molecular weight i(determined by gel permeation chromatics [sic] using a polystyrene standard) from 1000 to 15,000, preferably from 1200 to 7000, particularly preferably from 1500 to 5000 and a glass transition temperature ($T_G$) from 30° to 80° C., preferably from 40° to 70° C., particularly preferably from 40° to 60° C. (measured with the aid of differential scanning calorimetry (DSC)).

The epoxide group-containing polyacrylate resin can be prepared according to generally well-known methods by free-radical polymerization.

The powder clearcoats employed in accordance with the invention contain as crosslinking agent a mixture of (A) 5 to 95, preferably 5 to 80, particularly preferably 10 to 50 percent by weight of a compound which contains on statistical average at least two carboxyl groups and at least one, preferably at least two acid anhydride groups per molecule, or a mixture of such compounds, and (B) 95 to 5, preferably 95 to 20, particularly preferably 90 to 50 percent by weight of a carboxyl group-containing polyester resin which is obtainable by reacting (b1) a diol or a mixture of diols, (b2) a compound which contains per molecule at least three functional groups selected from hydroxyl, primary amino, secondary amino, carboxyl and acid anhydride groups, one acid anhydride group being regarded as equivalent to two carboxyl groups, or a mixture of such compounds, and (b3) a dicarboxylic acid, a dicarboxylic acid anhydride or a mixture of dicarboxylic acids and/or dicarboxylic acid anhydrides in a molar ratio of (b1):(b2):(b3)=0.0 to 3.0:1.0:1.5 to 9.0, preferably 0.0 to 2.0:1.0:2.0 to 8.0, particularly preferably 0.5 to 2.0:1.0:2.0 to 6.0 to give a polyester resin having an acid value of 40 to 300, preferably 80 to 250, the percentages by weight relating to (A)+(B)=100 percent by weight.

As component (A) it is possible to employ polyanhydrides of polycarboxylic acids or mixtures of polycarboxylic acids, in particular polyanhydrides of dicarboxylic acids or mixtures of dicarboxylic acids. Such polyanhydrides can be prepared by removing water from the polycarboxylic acid or the mixture of polycarboxylic acids, in each case two carboxyl groups being converted to one anhydride group. Such preparation processes are well known and therefore require no further discussion.

As component (A) it is also possible to employ polyanhydrides modified with a polyol, as are described in EP-A-299,420.

As component (A) it is preferred to employ linear polyanhydrides of aliphatic or cycloaliphatic dicarboxylic acids having 3 to 20, preferably 6 to 12 carbon atoms in the molecule or linear polyanhydrides of mixtures of such dicarboxylic acids. Specific examples of polyanhydrides which are preferably employed are poly(adipic anhydride), poly(azelaic anhydride), poly(sebacic anhydride), poly(dodecanedioic anhydride) and poly(cyclohexanedicarboxylic anhydride).

The carboxyl group-containing polyester resin employed as component (B) can be obtained by reacting (b1) a diol or a mixture of diols, (b2) a compound which contains per molecule at least three functional groups selected from hydroxyl, primary amino, secondary amino, carboxyl and acid anhydride groups, one acid anhydride group being regarded as equivalent to two carboxyl groups, or a mixture of such compounds, and (b3) a dicarboxylic acid, a dicarboxylic acid anhydride or a mixture of dicarboxylic acids and/or dicarboxylic acid anhydrides in a molar ratio of (b1):(b2):(b3)=0.0 to 3.0:1.0:1.5 to 9.0, preferably 0.0 to 2.0:1.0:2.0 to 8.0, particularly preferably 0.5 to 2.0:1.0:2.0 to 6.0 to give a polyester resin having an acid value of 40 to 300, preferably 80 to 250.

The reaction of (b1), (b2) and (b3) is carried out in accordance with the well-known methods of polyester resin preparation. The reaction temperatures are conventionally from 140° to 240° C., preferably 160° to 200° C.

As component (b1) a diol or a mixture of diols is employed. A diol is understood to be an organic compound which contains two hydroxyl groups per molecule. Examples of diols which can be employed are ethylene glycol, propylene glycol, neopentyl glycol, 1,6-hexanediol, cyclohexanediol, cyclohexanedimethanol, hydrogenated bisphenol A, adducts of ethylene oxide or propylene oxide with bisphenol A, hydrogenated bisphenol A and diethylene glycol. As component (b1) it is preferred to employ aliphatic or cycloaliphatic diols having 2 to 16, preferably 2 to 12 carbon atoms in the molecule, or mixtures of such diols.

As component (b2) a compound is employed which contains per molecule at least three functional groups selected from hydroxyl, primary amino, secondary amino, carboxyl and acid anhydride groups, one acid anhydride group being regarded as equivalent to two carboxyl groups, or a mixture of such compounds.

As component (b2) it is possible to employ compounds which contain per molecule at least three hydroxyl groups. Examples of such compounds are trimethylolpropane, pentaerythritol, trimethylolethane and glycerol.

As component (b2) it is also possible to employ compounds which contain per molecule two hydroxyl and one carboxyl group. An example of such a compound is dimethylolpropionic acid.

As component (b2) it is also possible to employ compounds which contain per molecule two primary amino and one hydroxyl group. An example of such a compound is diaminopropanol.

As component (b2) it is also possible to employ compounds which contain per molecule at least three carboxyl or at least one acid anhydride and one carboxyl group. Examples of such compounds are trimellitic acid, trimellitic anhydride, pyromellitic acid and pyromellitic anhydride.

As component (b3) a dicarboxylic acid, a dicarboxylic acid anhydride or a mixture of dicarboxylic acids and/or dicarboxylic acid anhydrides is employed. Examples of dicarboxylic acids which can be employed are saturated and unsaturated aliphatic or cycloaliphatic dicarboxylic acids such as adipic acid, sebacic acid, azelaic acid, dodecanedioic acid, maleic acid, fumaric acid, succinic acid, hexahydrophthalic acid and tetrahydrophthalic acid. Examples of dicarboxylic acid anhydrides which can be employed are the anhydrides of the stated acids.

As component (b3) it is also possible to employ aromatic dicarboxylic acids and their anhydrides, for example phthalic acid, isophthalic acid and terephthalic acid. The use of aromatic dicarboxylic acids and their anhydrides is less preferred.

The mixture of (A) and (B) is usually employed in an amount such that 0.5 to 1.5, preferably 0.75 to 1.25 equivalents of carboxyl groups are present per equivalent of epoxide groups of the epoxide group-containing polyacrylate resin, each anhydride group being regarded as equivalent to one carboxyl group. The amount of carboxyl groups present can be determined by titration with an alcoholic KOH solution. In this titration, one monofunctional carboxyl group is found for each anhydride group.

The powder clearcoats employed in accordance with the invention can also contain, in addition to the epoxide group-containing polyacrylate resin and the mixture of (A) and (B), one or more crosslinking catalysts, transparent pigments and further additives conventional for powder clearcoats, for example UV stabilizers and leveling assistants.

The powder clearcoats employed in accordance with the invention can be prepared by mixing the epoxide group-containing polyacrylate resin, the mixture of (A) and (B) and any further conventional additives, extruding the mixture and milling the resulting extrudate.

The two-coat finishes produced according to the process of the present invention can be applied to any desired substrates, for example metal, wood, glass or plastic. It is preferred to use the process according to the invention for the production of two-coat finishes for car bodies.

By admixing white or colored pigments, colored powder coatings can also be produced from the powder clearcoats employed in accordance with the invention. These powder coatings can also be employed for coating any desired substrates, for example metal, wood, glass or plastic, with a single coat.

The powder coatings employed in accordance with the invention can be employed using all application techniques conventional for powder coatings. The powder coatings are preferably applied electrostatically.

The invention is illustrated in more detail in the following examples. All parts and percentages are by weight, unless expressly stated otherwise.

1. Preparation of an epoxide group-containing polyacrylate resin

A mixture of 37.06 parts by weight of methyl methacrylate, 14.40 parts by weight of glycidyl methacrylate, 9.00 parts by weight of n-butyl acrylate and 6.54 parts by weight of styrene is added over 4 hours at 120° C to 30.0 parts by weight of xylene. Commencing with the addition of the monomer mixture, 3.0 parts of tert-butyl per-2-ethylhexanoate (TBPEH; manufacturer: Peroxid Chemie) are added over 4.5 hours. During the addition of the monomer mixture and the peroxide, the reaction temperature is 140° C. When the addition of the peroxide is complete this temperature is maintained for a further hour. The xylene is then removed under reduced pressure, and the synthetic resin is heated to 180° C. and drained off from the reaction vessel. The resulting polyacrylate resin has an epoxide equivalent weight of 686 g/mol.

2. Preparation of component (A)

67.2 parts by weight of dodecanedioic acid together with 29.8 parts by weight of acetic anhydride are weighed out and charged to a reaction vessel with reflux sensor [sic]. The mixture is heated slowly until reflux commences and left under reflux for 3 hours. The acetic acid which is formed is then distilled off. 3.00 parts by weight of acetic anhydride again are then added to the reaction product, and the mixture is heated for one hour at reflux temperature. Finally, the acetic acid which has formed is distilled off and the reaction product is drained off from the reaction vessel at 90° C.

3. Preparation of Component (B)

3.1. 153.3 g of hexane-1,6-diol, 370.6 g of trimethylolpropane, 119.9 g of diethylene glycol and 1419.3 g of hexahydrophthalic anhydride are weighed out and charged to a reaction vessel. The mixture is heated slowly and the water which forms is removed from the reaction mixture using a water separator. As soon as the reaction product has reached an acid value of 160, the mixture is cooled and drained off from the reaction vessel at 100° C. The resulting carboxylic group-containing polyester resin has a glass transition temperature (TG) of 26° C.

3.2. 612.9 g of cyclohexane-1,4-dimethanol, 513.9 g of succinic anhydride, 792.4 g of hexahydrophthalic anhydride and 328.8 g of trimethylolpropane are weighed out and charged to a reaction vessel. The mixture is heated slowly and the water which forms is removed from the reaction mixture using a water separator. As soon as the reaction product has reached an acid value of 135, the mixture is cooled and drained off from the reaction vessel at 100° C. The resulting carboxylic group-containing polyester resin has a glass transition temperature ($T_G$) of 25° C.

4. Preparation of powder clearcoats according to the invention 4.1. 1372 g of the epoxide group-containing polyacrylate resin prepared as in Section 1, together with 124 g of component (A) prepared as in Section 2, 438 g of component (B) prepared as in Section 3.1, 48.8 g of a first light stabilizer (Tinuvin® 900, manufacturer: Ciba Geigy AG), 32.5 g of a second light stabilizer (Tinuvin® 144, manufacturer: Ciba Geigy AG), 813 [sic] g of benzoin and 8.13 g of a polyacrylate resin-based leveling agent (Per® hole F40, manufacturer: Henkel KGaA), are comminuted and premixed in a precutting mill. The mixture thus obtained is then extruded in a co-kneader from Buss (type PLK 46), the temperature in the center of the extrusion space being 90°–110° C. The extrudate is cooled rapidly to room temperature, milled in an impact mill (ACM 2 L from Hosokawa MikroPul) to a powder with an average particle diameter of 30–40 μm, and screened through a sieve with a pore size of 125 μm.

4.2. 1372 g of the epoxide group-containing polyacrylate resin prepared as in Section 1, together with 126.7 g of component (A) prepared as in Section 2, 553.3 g of component (B) prepared as in Section 3.1, 53.9 g of a first light stabilizer (Tinuvin® 900, manufacturer: Ciba Geigy AG), 36.0 g of a second light stabilizer (Tinuvin® 144, manufacturer: Ciba Geigy AG), 9.0 g of benzoin and 9.0 g of a polyacrylate resin-based leveling agent (Perenol® F40, manufacturer: Henkel KGaA), are comminuted and premixed in a precutting mill. The mixture thus obtained is then extruded in a co-kneader from Buss (type PLK 46), the temperature in the center of the extrusion space being 90°–110° C. The extrudate is cooled rapidly to room temperature, milled in an impact mill (ACM 2 L from Hosokawa MikroPul) to a powder with an average particle diameter of 30–40 μm, and screened through a sieve with a pore size of 125 μm.

5. Preparation of powder clearcoats of the prior art 5.1. Preparation of a polymeric anhydride modified according to the teaching of EP-A-299,420 97.8 parts by weight of trimethylolpropane are added to 874 parts by weight of component (A) prepared as in Section 2 and the reaction mixture is held for 1.5 hours at 130° C. The reaction product is then drained off from the reaction vessel at 90° C.

5.2. Preparation of a powder clearcoat according to the teaching of EP-A-299,420 1372 g of the epoxide group-containing polyacrylate resin prepared as in Section 1, together with 380 g of the polymeric anhydride modified as in Section 5.1, 44.2 g of a first light stabilizer (Tinuvin® 900, manufacturer: Ciba Geigy AG), 29.5 g of a second light stabilizer (Tinuvin® 144, manufacturer: Ciba Geigy AG), 7.4 g of benzoin and 7.4 g of a polyacrylate-based acrylate-based leveling agent (Perenol® F40, manufacturer: Henkel), are comminuted and premixed in a precutting mill. The mixture thus obtained is then extruded in a co-kneader from Buss (type PLK 46), the temperature in the center of the extrusion space being 90°–110° C. The extrudate is cooled rapidly to room temperature, milled in an impact mill (ACM 2 L from Hosokawa MikroPul) to a powder with an average particle diameter of 30–40 μm, and screened through a sieve with a pore size of 125 μm. This powder coating contains a quantity of the polymeric anhydride modified as in Section 5.1 such that—as in the powder coatings according to the invention prepared as in Sections 4.1. and 4.2.—one free carboxyl group or one anhydride group of the crosslinking agent is present per epoxide group of the polyacrylate resin. The remaining components were each employed in quantities such that the percentage proportions—based on the content of binder plus crosslinking agent equal to 100% by weight—correspond to those in the powder clearcoats according to the invention prepared as in Sections 4.1. and 4.2.

5.3. Preparation of a powder clearcoat containing only component (A) as crosslinking agent 1372 g of the epoxide group-containing polyacrylate resin prepared as in Section 1, together with 380 g of component (A) prepared as in Section 2, 44.2 g of a first light stabilizer (Tinuvin® 900, manufacturer: Ciba Geigy AG), 29.5 g of a second light stabilizer (Tinuvin® 144, manufacturer: Ciba Geigy AG), 7.4 g of benzoin and 7.4 g of a polyacrylate resin-based leveling agent (Perenol® F40, manufacturer: Henkel KGaA), are comminuted and premixed in a precutting mill. The mixture thus obtained is then extruded in a co-kneader from Buss (type PLK 46), the temperature in the center of the extrusion space being 90°–110° C. The extrudate is cooled rapidly to room temperature, milled in an impact mill (ACM 2 L from Hosokawa MikroPul) to a powder with an average particle diameter of 30–40 μm, and screened through a sieve with a pore size of 125 μm. This powder coating contains a quantity of the polymeric anhydride modified as in Section 5.1 such that—as in the powder clearcoats according to the invention prepared as in Sections 4.1. and 4.2.—one free carboxyl group or one anhydride group of the crosslinking agent is present per epoxide group of the polyacrylate resin. The remaining components were each used in a quantity such that the percentage proportions—based on the content of the binder plus crosslinking agent equal to 100% by weight—correspond to those in the powder coatings according to the invention prepared as in Sections 4.1. and 4.2.

6. Production of two-coat finishes

A commercially available, water-thinnable basecoat containing polyurethane, polyester and melamine resin and pigmented with aluminum flakes is applied to phosphatized steel panels coated with a commercially available electrodeposition coating and a commercially available filler so that a dry film thickness of 12 to 15 μm is obtained. The basecoat applied is dried for 10 minutes at room temperature and 10 minutes at 80° C. The steel panels coated in this way are then coated electrostatically with the powder clearcoats prepared as in Sections 4.1., 4.2., 5.2, and 5.3 so that a film thickness of the clearcoat of 50 to 60 μm is obtained. Finally, basecoat and powder clearcoat are baked for 20 minutes at 160° C. (panel temperature).

The two-coat finishes prepared using the powder clearcoats according to the invention prepared as in Sections 4.1. and 4.2. exhibit better resistance to alkalis, tree resin, pancreatin, premium-grade petrol and methyl ethyl ketone, better scratch resistances and better metallic effects and are harder than the two-coat finishes prepared using the powder clearcoats of the prior art prepared as in Sections 5.2. and 5.3.

We claim:

1. Process for the production of two-coat finishes on a substrate surface, comprising the steps of (1) applying a pigmented basecoat to the substrate surface, (2) forming a polymer film from the coat applied in step (1), (3) applying a powder clearcoat which contains an epoxide group-containing polyacrylate resin as binder to the resulting basecoat film, and subsequently (4) baking the basecoat together with the powder clearcoat, characterized in that the powder clearcoat employed in step (3) as crosslinking agent contains a mixture of (A) 5 to 95 percent by weight of a compound which contains on statistical average at least two carboxyl groups and at least one acid anhydride group per molecule, or a mixture of such compounds, selected from the group consisting of polyanhydrides of aliphatic polycarboxylic acids, polyanhydrides of cycloaliphatic polycarboxylic acids, and mixtures thereof, and (B) 95 to 5 percent by weight of a carboxyl group-containing polyester resin obtained by reacting
(b1) a diol or a mixture of diols,
(b2) a compound which contains per molecule at least three functional groups selected from the group consisting of hydroxyl, primary amine, secondary amine, carboxyl and acid anhydride groups, one acid anhydride group being regarded as equivalent to two carboxyl groups, and a mixture of such compounds and
(b3) a compound selected from the group consisting of dicarboxylic acid, a dicarboxylic acid anhydride, and mixtures thereof in a molar ratio of (b1):(b2):(b3) =0.0 to 3.0:1.0:1.5 to 9.0 to give a polyester resin having an acid value of 40 to 300, the percentages by weight relating to (A)+(B)= 100 percent by weight.

2. Process according to claim 1, characterized in that the basecoat applied in step (1) contains a metallic pigment.

3. Process according to claim 1, characterized in that the basecoat applied in step (1) contains an aluminum flake pigment.

4. Powder coatings which contain an epoxide group containing polyacrylate resin as binder, characterized in that they contain as crosslinking agent a mixture of (A) 5 to 95 percent by weight of a compound which contains on statistical average at least two carboxyl groups and at least one acid anhydride group per molecule, or a mixture of such compounds, selected from the group consisting of polyanhydrides of aliphatic polycarboxylic acids, polyanhydrides of cycloaliphatic polycarboxylic acids, and mixtures thereof (B) 95 to 5 percent by weight of a carboxyl group-containing polyester resin obtained by reacting
(b1) a diol or a mixture of diols,
(b2) a compound which contains per molecule at least three functional groups selected from the group consisting of hydroxyl, primary amino, secondary amino, carboxyl and acid anhydride groups, one acid anhydride group being regarded as equivalent to two carboxyl groups, and mixtures thereof and
(b3) a compound selected from the group consisting of dicarboxylic acid, a dicarboxylic acid anhydride, and mixtures thereof in a molar ratio of (b1):(b2):(b3)= 0.0 to 3.0:1.0:1.5 to 9.0 to give a polyester resin having an acid value of 40 to 300, the percentages by weight relating to (A)+(B)=100 percent by weight.

5. Powder coatings according to claim 4 comprising powder clearcoats for the production of two-coat finishes.

* * * * *